United States Patent
Santerre

(10) Patent No.: US 7,124,662 B2
(45) Date of Patent: Oct. 24, 2006

(54) REVERSIBLE DRIVING APPARATUS FOR PCU PUMPS

(75) Inventor: Richard Santerre, Brossard (CA)

(73) Assignee: Pratt & Whitney Canada Corp., Longueuil (CA)

( * ) Notice: Subject to any disclaimer, the term of this patent is extended or adjusted under 35 U.S.C. 154(b) by 89 days.

(21) Appl. No.: 10/766,805

(22) Filed: Jan. 30, 2004

(65) Prior Publication Data

US 2005/0166705 A1    Aug. 4, 2005

(51) Int. Cl.
*F16H 37/06* (2006.01)
*F16H 1/14* (2006.01)
*A47C 7/74* (2006.01)

(52) U.S. Cl. ............... 74/665 H; 74/417; 416/170 R

(58) Field of Classification Search ............. 74/665 H, 74/665 Q, 810.1, 404, 416–7, 423; 60/439–41, 60/486; 244/53 R, 60; 416/170 R
See application file for complete search history.

(56) References Cited

U.S. PATENT DOCUMENTS

| | | | | |
|---|---|---|---|---|
| 2,361,954 A | * | 11/1944 | Erle ........................... 416/47 |
| 2,699,304 A | * | 1/1955 | Treseder et al. ........ 244/134 D |
| 2,748,716 A | | 6/1956 | Janik |
| 2,922,931 A | * | 1/1960 | Tyler et al. ................. 361/170 |
| 3,262,659 A | * | 7/1966 | Copeland .................... 244/207 |
| 3,486,478 A | * | 12/1969 | Halliday ...................... 440/58 |
| 3,590,651 A | * | 7/1971 | Vallieres ...................... 74/404 |
| 3,591,109 A | * | 7/1971 | McLarty .................. 244/17.23 |
| 3,861,623 A | * | 1/1975 | Fruechte ................... 244/53 R |
| 3,924,411 A | | 12/1975 | May ............................. 60/486 |
| 3,942,911 A | * | 3/1976 | Keenan et al. .......... 416/157 A |
| 3,960,469 A | | 6/1976 | Lindtveit ..................... 418/39 |
| 3,985,473 A | | 10/1976 | King et al. ................. 417/315 |
| 4,068,470 A | * | 1/1978 | Sargisson et al. .......... 60/226.1 |
| 4,270,408 A | * | 6/1981 | Wagner ....................... 74/661 |
| 4,311,435 A | * | 1/1982 | Bergero ...................... 74/417 |
| 4,678,402 A | | 7/1987 | Roe ........................ 416/157 R |
| 4,711,615 A | * | 12/1987 | Rusu ........................... 416/46 |
| 4,900,224 A | | 2/1990 | Timperi et al. .......... 415/213.1 |
| 4,936,746 A | | 6/1990 | Mayo et al. .................. 416/46 |
| 5,496,155 A | | 3/1996 | Noah et al. ................. 417/310 |
| 5,509,323 A | * | 4/1996 | Hallenstvedt et al. ......... 74/417 |
| 5,540,563 A | | 7/1996 | Hansell ...................... 417/269 |
| 5,845,483 A | * | 12/1998 | Petrowicz .................... 60/788 |
| 6,095,459 A | * | 8/2000 | Codina ....................... 244/213 |
| 6,502,394 B1 | | 1/2003 | Trimble ....................... 60/486 |

FOREIGN PATENT DOCUMENTS

| | | |
|---|---|---|
| CA | 1205654 | 6/1986 |
| CA | 2358021 | 3/2003 |

OTHER PUBLICATIONS

Bryant and Dudley, Which Right-Angle-Gear System?, 1970, p. 50.*
Mabie and Reinholts, Mechanisms and Dynamics of Machinery, 1987, pp. 206-207, 245.*
Paul Grafstein and Otto B. Schwarz—Pictorial Handbook of Technical Devices, published by Chemical Publishing co., Inc., New York—1971 (pp. 60 and 61).

* cited by examiner

*Primary Examiner*—Roger Pang
(74) *Attorney, Agent, or Firm*—Ogilvy Renault LLP

(57) ABSTRACT

An accessory driving apparatus for an aircraft system is connected to an accessory unit to be driven, such as a PCU pump. A gear set for transferring rotational power from the driving shaft to the driven shaft is provided for selective arrangement in first and second configurations in order to permit the driving shaft to rotate in either rotational direction without affecting a predetermined rotational direction of the driven shaft.

13 Claims, 4 Drawing Sheets

REVERSIBLE DRIVING APPARATUS FOR PCU PUMPS

FIELD OF THE INVENTION

The present invention relates to an accessory driving apparatus for an aircraft system, and more particularly to a reversible apparatus for driving a propeller control unit (PCU) pump of an aircraft system.

BACKGROUND OF THE INVENTION

Today's propeller aircraft generally include variable pitch propeller systems. Typically, a variable pitch propeller system for aircraft includes a plurality of propeller blades extending radially from a central hub, an engine for rotating the hub and propeller blades, and a pitch actuating system that pivots the propeller blades about their longitudinal axis to vary the angle (pitch) of the blades with respect to the approaching airflow. The pitch actuating system is hydraulically controlled by a propeller control unit (PCU) and is hydraulically powered by a PCU pump of an aircraft system.

PCU pumps are usually operatively connected to and thus driven by propeller shafts of the aircraft system. PCU pumps are conventionally unidirectional, either clockwise or counter-clockwise. The selective use of clockwise and counter-clockwise PCU pumps is determined in accordance with the propeller shafts to which the PCU pumps are to be operatively connected.

In a multi-propeller aircraft system, it has been considered to be advantageous to the aircraft system performance that the propellers of the aircraft rotate in different directions, namely some propellers rotate in a clockwise direction and the remaining propellers rotate in a counter-clockwise direction. This can be achieved by providing either a clockwise or counter-clockwise propeller gearbox to couple the particular propeller shaft to each engine which drives that propeller. In order to meet with this type of demand, aircraft engine manufacturers are required to provide both clockwise and counter-clockwise PCU pumps for a single design of aircraft system, which increases manufacturing costs due to the need for double the pump inventory.

Reversible rotary pumps have been well known and used in other industries. Those reversible rotary pumps, however, are usually relatively complicated and therefore are not suitable for application in the aircraft industry. PCU pumps for an aircraft system are required to be reliable in performance and light in weight.

Therefore, there is a need for an apparatus for driving a unidirectional PCU pump of an aircraft system which overcomes the problems in the prior art.

SUMMARY OF THE INVENTION

One object of the present invention is to provide an apparatus for driving a PCU pump of an aircraft system which is suitable for obtaining rotation power from a driving shaft rotating in either rotational direction, to drive the pump in a predetermined direction of rotation.

In accordance with one aspect of the present invention, there is a method provided for obtaining rotational power from a driving shaft to drive a unidirectional pump of an aircraft system. The method comprises providing a driven shaft disposed at an angle with respect to the driving shaft, and operatively connected to the unidirectional pump; and providing a gear set for transferring rotational power from the driving shaft to the driven shaft, the gear set being selectively arranged in first and second configurations, depending on a rotational direction of the driving shaft, in order to ensure that a rotational direction of the driven shaft satisfies a predetermined rotational direction of the unidirectional pump.

Preferably, the method further comprises determining a first position on the driving shaft for mounting a first bevel gear when the first configuration is selected such that the first bevel gear meshes with the bevel pinion on the driven shaft at a first point of the bevel pinion; and determining a second position on the driving shaft for mounting the second bevel gear when the second configuration is selected such that the second bevel gear meshes with the bevel pinion on the driven shaft at a second point of the bevel pinion diametrically opposed to the first point.

In accordance with another aspect of the present invention there is an accessory driving apparatus provided for an aircraft system which comprises a driving shaft adapted to provide rotational power and a driven shaft adapted to be driven by the driving shaft and to be connected to an accessory unit to be driven. The driven shaft is positioned at an angle with respect to the driving shaft. A gear set is provided for transferring rotational power from the driving shaft to the driven shaft, and the gear set is adapted for selective arrangement in first and second configurations in order to permit the driving shaft to rotate in either rotational direction without affecting a predetermined rotational direction of the driven shaft.

In accordance with a further aspect of the present invention, an apparatus is provided for reversibly driving a propeller control unit (PCU) pump of an aircraft system comprising a driven shaft adapted to be driven by a propeller shaft and to be connected to the PCU pump, the driven shaft being positioned at an angle substantially perpendicular with respect to the propeller shaft. The apparatus is further provided with a gear set which includes a first bevel gear selectively mounted to the propeller shaft in a first axial position thereof, a second bevel gear selectively mounted to the propeller shaft in a second axial position thereof and a bevel pinion mounted to the driven shaft at an end thereof for selectively gearing into the first or second bevel gears. The selection of mounting the first and second bevel gears to the propeller shaft is based on a rotational direction of the propeller shaft, in order to ensure that the driven shaft rotates in a predetermined rotational direction.

The present invention overcomes the shortcomings of the prior art with a simple solution in which the driven bevel pinion mounted on the PCU pump shaft is positioned at a right angle to a driving bevel gear being mounted on the propeller shaft in selective positions such that the same PCU pump can be used regardless of the rotational direction of the propeller shaft. Therefore, the present invention advantageously provides the flexibility of replacing a clockwise propeller gearbox with a counter-clockwise propeller gearbox or vise versa, as required, without changing the PCU pump. Thus, only a minimum inventory is required because the same PCU pumps, the same bevel pinions and the same propeller shaft configurations can be used for aircraft systems having propellers rotating in either or both directions. There is only one extra bevel gear needed, which will be further explained with reference to an embodiment described hereinafter.

BRIEF DESCRIPTION OF THE DRAWINGS

Having thus generally described the nature of the present invention, reference will now be made to the accompanying drawings, showing by way of illustration a preferred embodiment thereof, in which.

DETAILED DESCRIPTION OF THE PREFERRED EMBODIMENT

Figure 1:
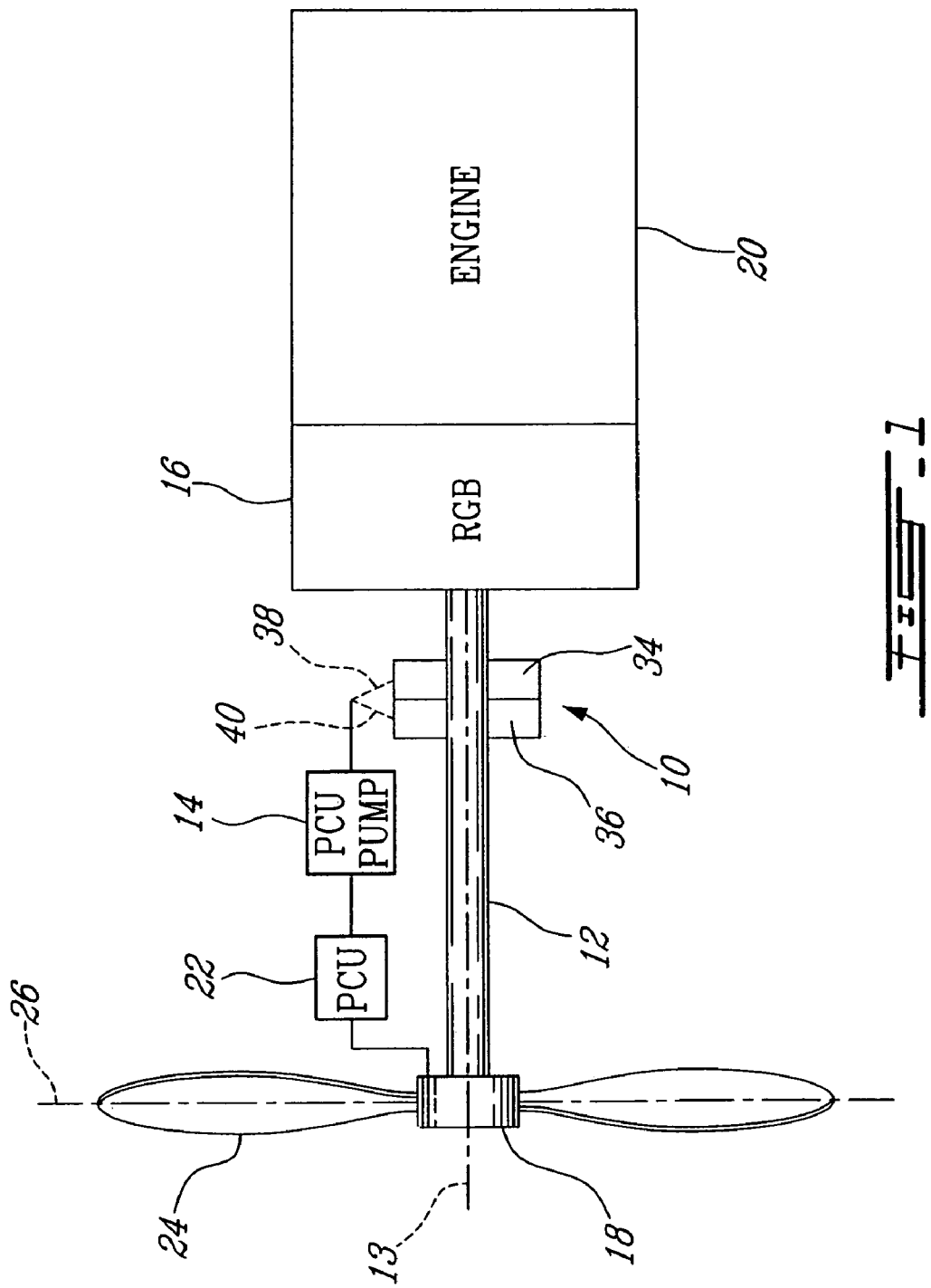
FIG. 1 is a schematic illustration of an aircraft system, for hydraulically adjusting the pitch of propeller blades, which incorporates one embodiment of the present invention.
Figure 2:
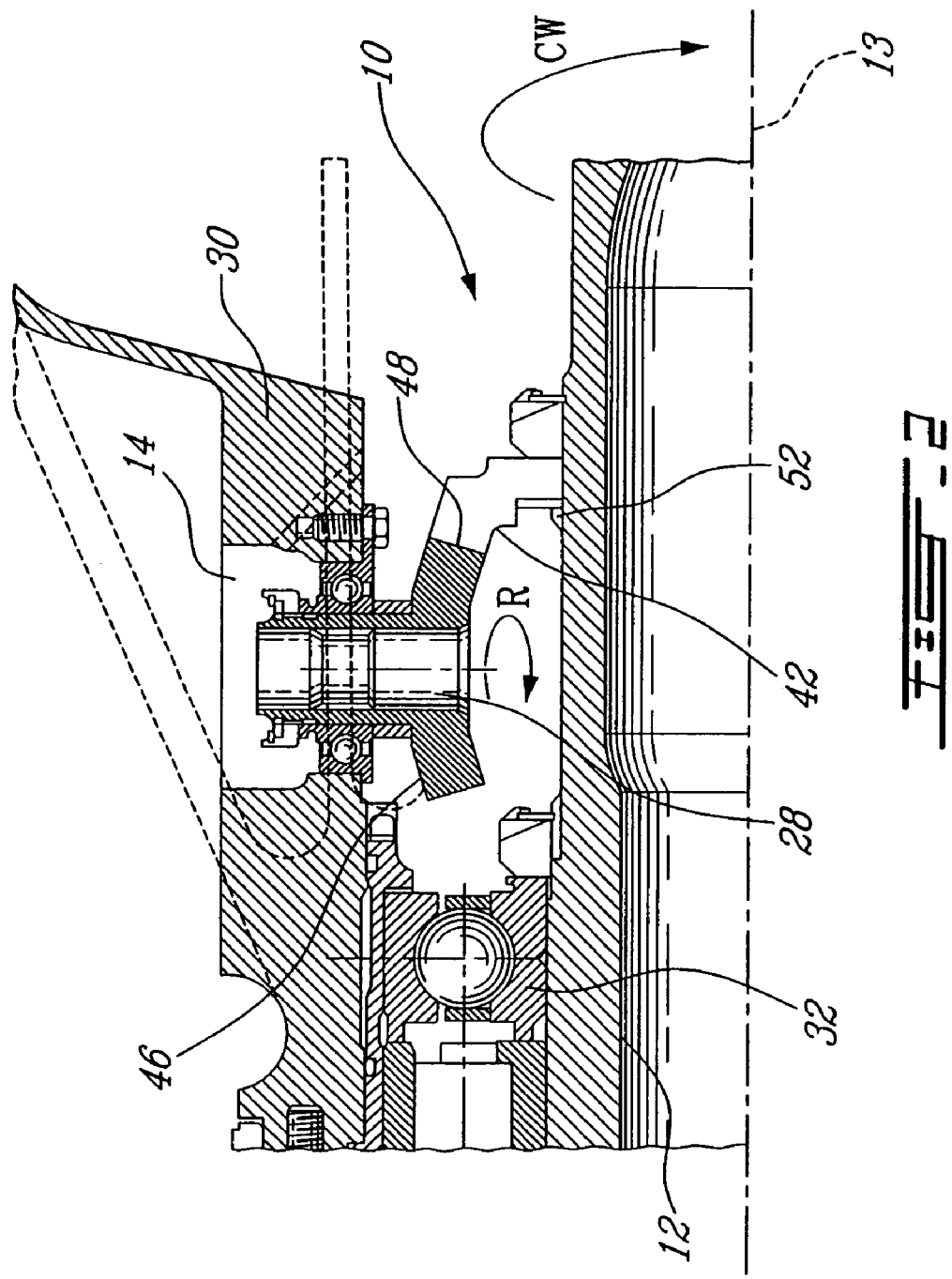
FIG. 2 is a cross-sectional view of a section of an aircraft system incorporating the embodiment of the present invention illustrated in FIG. 1, showing a first configuration of an apparatus for driving a propeller controlled unit (PCU) pump.
Figure 3:
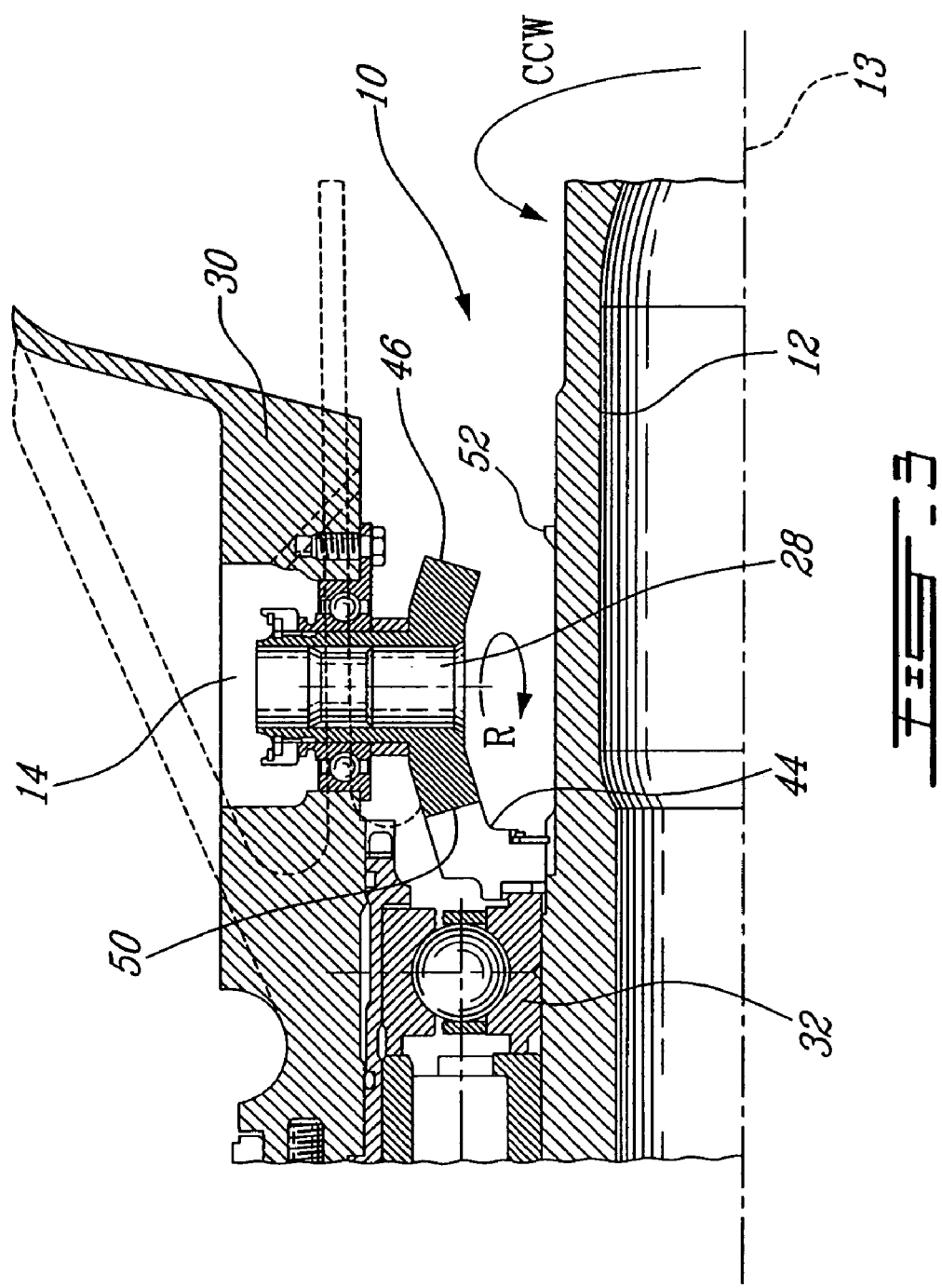
FIG. 3 is a cross-sectional view of the section of the aircraft system incorporating the embodiment of the present invention illustrated in FIG. 1 showing a second configuration of the apparatus for driving a propeller controlled PCU pump.
Figure 4:
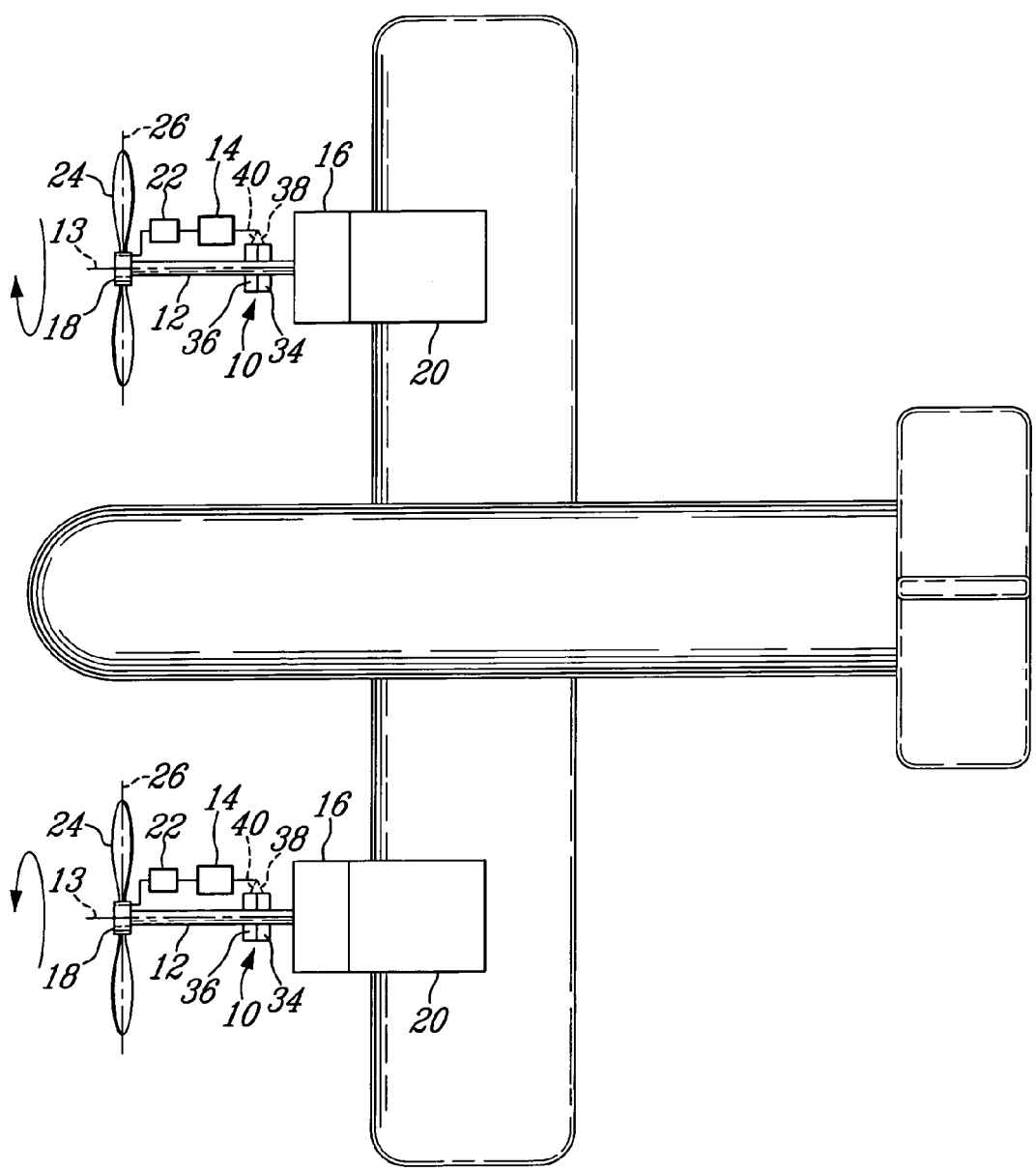
FIG. 4 is a schematic illustration of a multi-propeller aircraft system incorporating the embodiment of the present invention.

Referring to FIGS. 1, 2 and 3, an apparatus generally indicated by numeral 10 according to one preferred embodiment of the present invention is provided for obtaining rotational power from a driving shaft, for example a propeller shaft 12, to drive an accessory unit of the aircraft system, for example a unidirectional propeller control unit (PCU) pump 14. The propeller shaft 12, a central axis of which is indicated by numeral 13, extends at one end thereof from a propeller gearbox or so-called reduction gearbox (RGB) 16 and is coupled at the other end thereof with the propeller assembly 18. The RGB 16 is typically mounted to, for example, a gas turbine engine 20 of the aircraft (See FIG. 4) such that the propeller shaft 12 transmits power from the engine 20 to the propeller assembly 18. The direction of rotation of the propeller assembly 18 and the propeller shaft 12 is determined by use of a clockwise (CW) RGB or a counter-clockwise (CCW) RGB mounted to the same engine 20. PCU pump 14 is intended to provide hydraulic power for a propeller control unit (PCU) 22 to controllably actuate a pivot movement of propeller blades 24 about their longitudinal axis 26 for pitch (angle) adjustment. The PCU pump 14 can be driven in rotation only in one predetermined direction, and therefore the apparatus 10 according to the present invention is adapted to ensure that predetermined direction of rotation of the PCU pump 14 regardless of the direction of rotation of the propeller shaft 12.

Apparatus 10 includes a driven shaft 28 which is operatively connected to the PCU pump 14 for driving the pump in rotation in the predetermined direction. The driven shaft 28 can be either an integrated part of the PCU pump 14 or an additional part to be attached to the PCU pump 14. The PCU pump 14 is mounted to a stationary structure 30 of the aircraft system in a manner such that the driven shaft 28 is disposed at an angle with respect to the propeller shaft 12 which is rotatably supported by the same stationary structure 30 by means of a bearing assembly 32. The driven shaft 28 is preferably disposed substantially perpendicular to the propeller shaft 12. The reason for this will be further discussed hereinafter.

Apparatus 10 preferably includes a first configuration 34 and a second configuration 36 which are selectively used, as illustrated by the broken lines 38, 40 in FIG. 1, depending on a rotational direction of the propeller shaft 12. In particular, a first bevel gear 42 is mounted to the propeller shaft 12 at a first axial position thereof when the first configuration of the apparatus 10 is selected (illustrated in FIG. 2). A third bevel gear, for example a bevel pinion 46 in this embodiment, is mounted to the driven shaft 28, preferably at the free end thereof. The bevel angles of the respective gear 42 and the pinion 46 are determined such that the bevel gear 42 gears well into the bevel pinion 46 at a first gearing point 48 of the bevel pinion 46. Therefore, in the first configuration, the apparatus 10 transfers the torque and rotational movement from the propeller shaft 12 to the driven shaft 28 for driving the PCU pump 14 in rotation through the first gearing point 48 between the first bevel gear 42 and the bevel pinion 46.

Apparatus 10 further includes a second bevel gear 44 which is preferably mounted to the propeller shaft 12 in a second axial position as illustrated in FIG. 3, when the second configuration of the apparatus 10 is selected. The bevel angles of the respective second gear 44 and the pinion 46 are determined such that the second bevel gear 44 gears well into the bevel pinion 46 at a second gearing point 50 of the pinion 46. The first and second gearing points 48, 50 are disposed diametrically opposite on the pinion 46.

When the propeller shaft 12 rotates in one direction, for example in the CW direction, as shown in FIG. 2, the first configuration of apparatus 10 is selected. The driven shaft 28 is driven by the propeller shaft 12 in CW rotation, by means of the first bevel gear 42 and the bevel pinion 46. The tangential linear velocity of the both bevel gear 42 and bevel pinion 46 at the first gearing point 48, is in a direction perpendicular to the surface of the paper of the drawing and towards the viewer at the front of the paper, because the bevel gear 42 rotates in the CW direction together with the propeller shaft 12. Thus, the pinion 46 is driven to rotate together with the driven shaft 28 in the direction of rotation indicated by arrow R in FIG. 2.

When the propeller shaft 12 rotates in the CCW direction and the second configuration of the apparatus 10 is selected, as illustrated in FIG. 3, the PCU pump 14 and the driven shaft 28 are driven to rotate by the propeller shaft 12 rotating in CCW rotation by means of the second bevel gear 44 and the bevel pinion 46. The tangential linear velocity of both bevel gear 44 and bevel pinion 46 at the second gearing point 50, is also perpendicular to the surface of the paper of the drawing, but directs away from the viewer into the paper, because the second bevel gear 44 rotates together with the propeller shaft 12 in the CCW direction. Thus, the pinion 46 is driven to rotate together with the driven shaft 28 in the direction of rotation indicated by the arrow R in FIG. 3, the same direction of rotation as shown in FIG. 2. Therefore, appropriate selection of the configurations of apparatus 10 of the present invention will ensure that the PCU pump 14 or other accessory devices which would be connected thereto, rotates in the predetermined direction of rotation, regardless of the direction of rotation of the driving shaft, such as the propeller shaft 12 in this embodiment.

It is understood that when the driven shaft 28 is disposed substantially perpendicular to the propeller shaft 12, the bevel angles of the first and second bevel gears 42, 44 can be substantially the same. This not only benefits a simpler configuration but also provides substantially the same speed and substantially equal power transmission efficiency from the propeller shaft 12 to the driven shaft 28 whenever the first or the second configuration of the apparatus 10 is selected. In application, straight teeth gearing produces relatively more noise and provides limited transmission efficiency. Therefore in the aircraft industry, gears with spiral teeth are widely used.

It should also be noted that although the first and second bevel gears 42, 44 can be made substantially identical when the driven shaft 28 is disposed substantially perpendicular to the propeller shaft 12, separate inventories of the respective first and second bevel gears 42, 44 are still preferred because the first and second bevel gears 42, 44 are preferably configured slightly differently for their different mounting positions.

It should be further noted that in this embodiment, although the bevel gears are selectively mounted in first and second axial positions on the driving shaft, it is applicable to selectively mount the bevel gears in first and second axial position on the driven shaft in other applications, when the existing configuration requires such an arrangement. This alternative arrangement will achieve substantially the same result.

It should be still further noted that the apparatus of the present invention can be used in applications where the driving shaft rotates in a predetermined rotational direction but the driven shaft is to be driven in either direction of rotation, as required. In that application, the selection of the configurations of the apparatus depends on the direction of rotation of the driven shaft, as required.

In order to conveniently mount the selective bevel gears 42, 44 to the propeller shaft 12, the propeller shaft 12 preferably includes appropriate configurations. For example, the diameter of a section thereof for mounting the first bevel gear 42 is slightly smaller than the diameter of the section thereof for mounting the second bevel gear 44, but has a small radial extending stopper 52 such that the first bevel gear 42 can be restrained at the first axial position on the propeller shaft 12 when the first configuration is selected and the second bevel gear 44 can pass over the radial stop 52 to the second axial position on the propeller shaft 12 where the bevel gear 44 is axially restrained by the bearing assembly 32 when the second configuration is selected. Thus, the central openings of the respective first and second bevel gears 42, 44 have different diameters in accordance with the diameters of the propeller shaft sections in the respective first and second axial positions. Keys and groove structures may be needed for circumferentially restraining the relative bevel gears 42, 44 and pinion 46 on the respective shafts for transferring torque therebetween. Furthermore, appropriate securing means are provided for securing the bearing assembly 32 and either bevel gear 42 or bevel gear 44 in place. Those securing means are well known in the prior art and a number of alternative configurations and elements can be used to achieve the selective mounting of the bevel gears 42, 44 to the propeller shaft 12, and the mounting of the pinion 46 to the driven shaft 28.

Modifications and improvements to the above-described embodiment of the present invention may become apparent to those skilled in the art. The foregoing description is intended to be exemplary rather than limiting. The scope of the present invention is therefore intended to be limited solely by the scope of the appended claims.

I claim:

1. A method for powering respective first and second propeller control unit (PCU) pumps of respective first and second propeller engines of a multi-engine aircraft, the first and second engines having respective pump driving shafts which rotate in opposite rotational directions relative to one another when the aircraft is operated, the method comprising the steps of:

providing a driven shaft of the first PCU pump disposed at an angle with respect to the pump driving shaft of the first engine;

providing a driven shaft of the second PCU pump disposed at said same angle with respect to the pump driving shaft of the second engine;

providing a first gear set mechanically connecting the pump driving shaft of the first engine to the driven shaft of the first PCU pump, the first gear set adapted to drive the first PCU pump in a rotational direction; and providing a second gear set mechanically connecting the pump driving shaft of the second engine to the driven shaft of the second PCU pump, the second gear set adapted to drive the second PCU pump in the same rotational direction as the first PCU pump, wherein the first gear set and second gear set differ by one gear.

2. The method as defined in claim 1 wherein the driven shafts of the first and second PCU pumps are positioned substantially identically with respect to the respective pump driving shafts of the first and second engines.

3. The method as defined in claim 1 wherein the first and second PCU pumps are substantially identical.

4. The method as defined in claim 1 comprising
mounting a driving bevel gear to the pump driving shaft of each of the first and second engines; and
mounting a driven bevel gear to each of the driven shafts of the first and second PCU pumps such that the driving and driven bevel gears meshingly engage one another in each of the first and second gear sets.

5. The method as defined in claim 4 wherein the pump driving shafts of the respective first and second engines comprise substantially identical output sections adapted for selectively mounting the driving bevel gears thereto at either a first or second axial location thereof such that the identical output sections of the pump driving shafts of the first and second engines can be selectively connected to either the first or second gear set.

6. The method as defined in claim 5 wherein the driven bevel gears mounted to the driven shafts of the first and second PCU pumps are substantially identical.

7. The method as defined in claim 6 further comprising:
determining the first axial location on the identical output sections of the pump driving shafts of the first and second engines such that the driving bevel gear of the first gear set mounted thereat meshes into the driven bevel gear of the first gear set at a first point of the driven bevel gear to form a configuration of the first gear set; and
determining the second axial location on the identical output sections of the pump driving shafts of the first and second engines such that the driving bevel gear of the second gear set mounted thereat meshes into the driven bevel gear of the second gear set at a second point of the driven bevel gear to form a configuration of the second gear set, the first and second meshing points being diametrically opposite with respect to the identical driven bevel gears.

8. A driving apparatus for powering first and second PCU pumps used in a multi-engine aircraft having first and second propeller engines, the first and second engines having respective pump driving shafts rotating in opposite rotational directions, and the first and second PCU pumps being unidirectional and operated in a same rotational direction, the apparatus comprising:

first and second driven shafts operatively connected to the respective first and second PCU pumps, and positioned at substantially identical angles with respect to said pump driving shafts of the first and second engines, respectively;

a first gear set including a driving bevel gear mounted to an output section of the pump driving shaft of the first engine and a driven bevel gear mounted to the first driven shift, the driving bevel gear meshingly engaging the driven bevel gear at a first point of the driven bevel gear to ensure the rotational direction of the first PCU pump;

a second gear set including a driving bevel gear mounted to an output section of the pump driving shaft of the second engine and a driven bevel gear mounted to the second driven shaft, the driving bevel gear meshingly engaging the driven bevel gear at a second point of the driven bevel gear in order to ensure the rotational direction of the second PCU pump;

wherein the driven bevel gears of the first and second gear sets are substantially identical; and wherein the output sections of the pump driving shafts of the first and second engines are substantially identical, both having a first axial location thereof for selective mounting the driving bevel gear of the first gear set and a second axial location thereof for selective mounting the driving bevel gear of the second gear set such that the first and second gear sets can be converted one to another by exchanging the individual driving bevel gears.

9. The driving apparatus as defined in claim 8 wherein the first and second driven shifts are positioned substantially perpendicularly to the respective pump driving shafts of the first and second engines.

10. The driving apparatus as defined in claim 9 wherein the first and second driven shifts are substantially identical, both having an end thereof for mounting the individual driven bevel gears.

11. The driving apparatus as defined in claim 10 wherein the first and second engaging points in the respective first and second gear sets are located diametrically opposite with respect to the driven bevel gears mounted to the ends of the respective first and second driven shifts.

12. The driving apparatus as defined in claim 8 wherein the driving bevel gears of the first and second gear sets are substantially identical except that central openings thereof are different.

13. The driving apparatus as defined in claim 12 wherein the identical output sections of the pump driving shafts of the first and second engines both comprise a first axial section thereof for mounting the driving bevel gear of the first gear set at the first axial location, diametrically smaller than a second axial section thereof for mounting the driving bevel gear of the second gear set such that the driving bevel gear of the first gear set can be restrained at the first axial location to form the first gear set when it is selected, and such that the driving bevel gear of the second gear set can pass over the first axial section to be restrained at the second axial location to form the second gear set when it is selected.

* * * * *